United States Patent Office 3,746,738
Patented July 17, 1973

3,746,738
SILICON CONTAINING POLYAZIMIDES
Enrico J. Pepe and James G. Marsden, Amawalk, N.Y., assignors to Union Carbide Corporation, New York, N.Y.
No Drawing. Filed Mar. 28, 1972, Ser. No. 238,973
Int. Cl. C08f *11/04*
U.S. Cl. 260—46.5 E
10 Claims

ABSTRACT OF THE DISCLOSURE

Polyazamides containing silicon moieties in the polymer backbone and/or pendant therefrom which are useful as fiber sizers, surfactants, coupling agents, and the like.

---

This invention relates to novel silicon containing polymeric materials which possess a variety of uses. More particularly, this invention relates to polymers which contain a secondary and/or tertiary amino group and a carboxamide group in their backbone and are bonded through a polyvalent organic group to a silicon atom.

This invention relates to novel silicon substituted compounds. These compounds possess silicon moieties bonded to polyazamides which contain at least secondary nitrogen groups in their backbone. Such polymers comprise a polyazamide moiety to which a silicon atom is pendently or internally bonded. The polyazamide moiety comprises a polycarboxamide containing secondary nitrogen atoms therein which are separated from the carbonyl moieties of the carboxamide groups by divalent alkylene groups containing one to three, inclusive, saturated carbon atoms, and has a nitrogen to carbonyl mole ratio of at least 1.5 and not exceeding about 26. Each bonded silicon atom is bonded through a carbon atom of an organic group which is directly bonded to a nitrogen atom of the polyazamide by a carbon to nitrogen bond. The remaining free valences of each silicon atom are bonded to at least one of a monovalent organic radical by a carbon to silicon bond, a hydrolyzable monovalent organooxy radical, hydrogen and/or oxygen which in turn is bonded to another silicon whose free valences are saturated by one of oxygen and monovalent organic radicals to for a siloxane. The weight of the pendent silicon containing moieties does not exceed twice the weight of the polyazamide moieties and comprises at least 0.25 weight percent of the total weight of the compound.

The novel compounds of this invention are complex structures which cannot be defined by conventional structural formulae and because they can be produced by diverse methods, they cannot be defined by any particular method. Diverse methods can be employed to produce a single product and a single method can produce diverse products.

The polyazamide moiety constitutes the basic backbone of the novel compounds of this invention. They can be made by a number of known processes and their physical structures and properties are dependent upon the compendent group in two fundamental ways. In one processes is the formation of an aminoester where the amino group is secondary amino. The next basic step to such processes is the condensation of such amino-esters, alone or with another polyamino compound, to a polyazamide.

The silicon atom is joined to the polyazamide as a pendent group in two fundamental ways. In one procedure, the silicon atom is part of a silicon compound which possesses at least one amino group and it is employed as a component in the polyazamide's manufacture. In the second procedure, the silicon atom is part of a silicon compound which contains a functional group which reacts with an amino group, such as epoxy, haloalkyl, carboxyl, isocyanato, carbamyl, haloformate, and the like, and it is reacted with the polyazamide.

The following are schematic illustrations of the manufacture of polyazamides and silicon-substituted polyazamides.

(A) PROCEDURE FOR MAKING POLYAZAMIDES (1) The Michael addition method involves the addition reaction of an ester of an alpha,beta-ethylenically unsaturated monocarboxylic acid with an amine, preferably a polyamine, to form an amino-alkyl carboxylic acid ester and the ester is condensed alone or with a polyamine to form the polyazamide. To illustrate some permutations of this procedure, reference is made to the following equations:

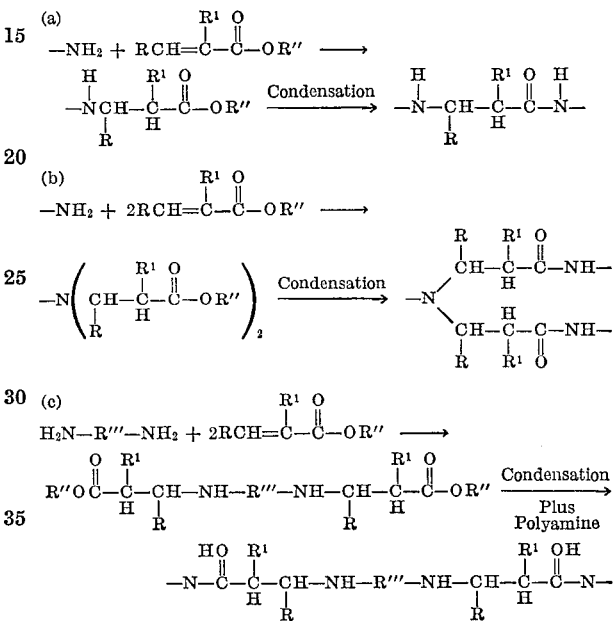

In the practice of any one of (a), (b), and (c), the resulting polyazamide is typically a mixture of the three types of product that each equation depicts and the proportion of each is dependent upon the initial stoichiometry of unsaturated ester to amine. This procedure is fully described by Rushton in U.S. Pat. No. 3,445,441, patented May 20, 1969, and by Dikerman and Simon, J. Org. Chem., 22, pp. 259–261 (1957). Other patents which relate to such Michaels additions include U.S. Pats. Nos. 2,146,210; 2,274,831; 2,744,086; 2,847,445; 3,048,620 and 3,359,241. Also containing descriptions of Michael addition reactions are Kohei Sanui et al., Bull. Chem. Soc. Jap. 41 (1), 256–9 (1968), Eng. and E. H. Riddle, Monomeric Acrylic Esters, Reinhold Publishing Co. 1954.

(2) The haloalkylation method involves the addition of ammonia or an amine (mono- or polyamine) to a haloalkanoic acid ester and the resulting sec.-amino-alkanoic acid ester is further condensed, with or without additional polyamine, to the polyazamide. By substituting, e.g.,

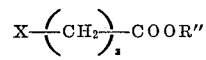

for the unsaturated acid esters of Equations 1(a), (b) and (c), above, the various permutations of products can be depicted. Distinctive from the Michael addition reaction, the haloalkylation reaction produces by-product hydrogen halide which is removable by providing tertiary amine or excess ammonia or amine in the reaction to sequester it. As is the case with the Michael addition reactions (a), (b), and (c), the products of haloalkylation are a mixture of the three types and the amount of each is dependent upon the stoichiometry of the reaction selected and the type of reactants.

From the above, it can be seen that statistically at least a portion of the polyazamide can be expected to contain tertiary amino groups. The amount of tertiary amino groups present can be increased by increasing the mole ratio of unsaturated ester or haloalkanoic acid ester to amino group and, conversely, the amount can be decreased by reducing that mole ratio. Even when the tertiary amino content is not detectable by conventional analytical techniques, it is believed that some tertiary amine groups are present. The significance of tertiary amine groups is that such reflects branching and cross-linking in the polyazamide structure. Thus, for all practical purposes, it is difficult to avoid branching or cross-linkages in the polyazamide moiety.

Regardless of whether the initial reaction for forming the polyazamide is the Michael addition reaction or haloalkylation, the first product of these reactions is a secondary amine, with or without the presence of tertiary amine. For example, one mole of ammonia and one mole of methyl acrylate, by the Michael addition will form the following products:

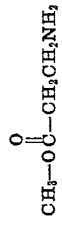

and $$CH_3-O\overset{O}{\underset{\|}{C}}-CH_2CH_2NH_2$$

To make a polyazamide from this mixture by condensation one should add a polyamine in an amount to provide about one amino hydrogen per carboxylate group. Desirably, there is provided about one primary amino per carboxylate group. The same condition and approach prevails when one mole of ammonia is reacted with one mole of haloalkanoate, e.g., methyl chloroacetate. If one mole of a diamine, e.g., ethylenediamine, is reacted with one mole of, e.g., methylacrylate or methyl chloroacetate, the following products will be obtained:

$$CH_2=CHC-OCH_3 + H_2NCH_2CH_2NH_2 \longrightarrow$$

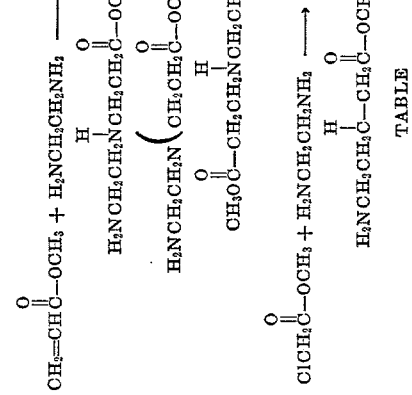

$$ClCH_2\overset{O}{\underset{\|}{C}}-OCH_3 + H_2NCH_2CH_2NH_2 \longrightarrow$$

$$H_2NCH_2CH_2N\left(CH_2\overset{O}{\underset{\|}{C}}-OCH_3\right)_2 +$$

$$CH_3O\overset{O}{\underset{\|}{C}}CH_2NCH_2CH_2NCH_2\overset{O}{\underset{\|}{C}}OCH_3$$

The above equations are not supposed to reflect the proportion each reaction product bears to the whole of the reaction products. The above equations are not balanced, nor are they intended to reflect any specific condition of reaction.

In addition to the above, the above reactions can be expected to form some tetra and tri-addition products, i.e., some tri and tetra-carboxylates. In such cases where tertiary amines and sym.-diesters are produced, some diamine must be unreacted and is available for amide formation in the subsequent condensation reaction.

The products of the Michael addition reaction or the haloalkylation reaction can be condensed with polyamine or the free amino groups which are provided or are present in such products. The condensation reaction can be operated at any temperature at which amidation takes place. The following table depicts various starting materials, solvents (where employed), reaction conditions, to produce the defined primary reaction products. The contents of the table are intended to be illustrative of this invention and are not intended to be used to define boundaries of starting materials, reaction conditions, and products of reaction. The final products depicted are intended to be demonstrative, and not limitative, of the spectrum of species intended to be encompassed by this invention.

TABLE

| | Aminoester formation | | | Polyazamide formation | |
|---|---|---|---|---|---|
| Carboxylate | —NH₂ compound | Primary adduct | | Condensation conditions | Polyazamide formation |
| 1.... $CH_2=CHC\overset{O}{\underset{\|}{}}-OC_2H_5$ | $NH_3$ | $(C_2H_5O\overset{O}{\underset{\|}{C}}CH_2CH_2)_2NH$ | | Incrementally add dry ethylenediamine, condense in dry methanol at 60° C. for 24 hours. | Water-soluble, amber, syrupy liquid. |
| 2.... $ClCH_2\overset{O}{\underset{\|}{C}}-OCH_3$ | $NH_3$ | $(CH_3O\overset{O}{\underset{\|}{C}}CH_2)_2NH$ | | Same as above | Do. |
| 3.... $ClCH_2CH_2\overset{O}{\underset{\|}{C}}-OCH_3$ | $NH_3$ | $(CH_3O\overset{O}{\underset{\|}{C}}CH_2CH_2)_2NH$ | | ......do...... | Water soluble, amber, brittle solid. |
| 4.... $ClCH_2\overset{H}{\underset{\|}{}}\overset{O}{\underset{\|}{C}}OCH_3$ phenyl | $H_2NCH_2CH_2NH_2$ | $(CH_3O\overset{O}{\underset{\|}{C}}CH_2CHCH_2NHCH_2)_2$ phenyl | | Same as above but at 140° C | Partially water-soluble, amber, horny solid soluble in toluene. |

TABLE—Continued

| | Aminoester formation | | Condensation conditions | Polyazamide formation |
|---|---|---|---|---|
| Carboxylate | —NH₂ compound | Primary adduct | | |
| 5... $CH_2=CHC(O)-OC_2H_5$ | $H_2NCH_2CH_2NH_2$ | $H_2NCH_2CH_2NHCH_2CH_2COOC_2H_5$ | Condense at 140° C. for 24 hours | Water soluble, amber, horny solid. |
| 6... $CH_3O-C(O)-C(CH_3)=CH_2$ | $H_2NCH_2CH_2NH_2$ | $H_2NCH_2CH_2NHCH_2CH(CH_3)-COOC_2H_5$ | Same as 5 above | Same as 5 above. |
| 7... $CH_2=C(CH_3)-C(O)-OCH_3$ | $H_2NCH(CH_3)CH_2NH_2$ | $(CH_3OC(O)-CH_2-CH_2NCH_2CH_2CH_3)_2$ | Same as 4 above | Same as 4 above. |
| 8... $CH_2=CH-C(O)-C(CH_3)=C-OCH_3$ | $H_2NCH_2CH_2NH_2$ | $(CH_3OC(O)-C(CH_3)-CH-NHCH_2)_2$ | ...do... | Same as 5 above. |
| 9... $CH_2-CH-C(O)-OC_2H_5$ (phenyl) | $H_2NCH(CH_3)CH_2NH_2$ | $(CH_3CH_2OC-CH_2CHNHCH_2CH_2)_2$ (phenyl) | ...do... | Same as 4 above. |
| 10... $CH_2=CHC(O)-OC_2H_5$ | $H_2NCH_2CH_2NH_2$ | $(C_2H_5OCCH_2CH_2)_2NCH_2CH_2NH_2$ | Same as 5 above | Same as 5 above. |
| 11... $CH_2=CHCOOC_2H_5$ | $H_2NCH_2CH_2NH(CH_2)_3Si(OCH_3)_3$ | $(C_2H_5OCCH_2CH_2)_2NCH_2CH_2NH(CH_2O)_3Si-(CH_3)_3$ | Same as 1 above | Same as 1 above. |
| 12... $CH_2=CHCOOC_2H_5$ | $H_2NCH_2CH_2NH_2$ | Same as 10 above | Incrementally add equimolar mixture of ethylene diamine and primary adduct of 10 above, condense heat at 120° C. for 24 hours. | Water soluble, amber, condensed in water when mixed and condensed in water forms a water insoluble, amber, tough solid which firmly adheres to glass and aluminum. |
| 13... $CH_2=CHC(O)-OC_2H_5$ | $H_2N-\text{(phenyl)}-NH_2$ | $(C_2H_5OCCH_2CH_2)_2N-\text{(phenyl)}-NCH_2CH_2C-OC_2H_5$ | Same as 4 above | Water insoluble, toluene soluble, hard amber solid. |
| 14... Same as 13 above | Same as 13 above | Same as 13 above | Same as 4 above, but with diethylene triamine | Same as 13 above. |
| 15... ...do... | ...do... | ...do... | Same as 4 above, but with polyethylene imine (M.W. 1,200). | Same as 14 above. |

A wide variety of process conditions are suitable for producing the polyazamides defined herein. In general, the usual are recognized technology for effecting the Michael addition reaction, or the haloalkylation reaction can be applied in the practice of this invention. For review purposes, certain known factors should be appreciated in the practice of those reactions.

The Michael addition reaction is a rapid reaction that can be effected at relatively low temperatures, e.g., as low as about 0° C., to a temperature as high as about 150° C. and higher. Because the Michael addition can be effected more rapidly, in most cases, than ester condensation with amines, it is possible to achieve total addition before any condensation takes place, in the usual case. Thus, the product of such a reaction is an amino-ester which can be condensed to form a polycarboxamide.

The addition reaction can be effected neatly (i.e., without use of solvents) if all the reactants are liquid. However, if one or more of the reactants is solid, then a solvent for the reactants should be employed. In most cases, the solvent of choice will be a polar solvent or an aromatic hydrocarbon. Suitable solvents include, by way of example, alcohols (such as methanol, ethanol, 1-propanol, ethylene glycol, monomethyl ether of ethylene glycol), ethers (such as diethyl ether, di-n-propyl ether, di-n-butyl ether, tetrahydrofuran, dioxane), amides (such as N,N-dimethylformamide, N,N-dimethylacetamide), esters (such as ethylacetate, n-propyl-acetate, n-butylacetate), aromatic hydrocarbons (such as benzene, toluene, xylene), and the like. In some instances a mixture of solvents will prove more desirable to effect adequate solution of the solid reactants.

In effecting the Michael addition reaction, one may employ a wide range of temperatures, from as low as about 0° C. or lower, to as high as 150° C. or higher. The reaction usually proceeds rapidly with alpha, beta-ethylenically unsaturated carboxylic ester which are free of substituents other than hydrogen on the beta carbon atom, and less rapidly when the beta carbon atom is substituted. In the former case, addition can be easily effected at room temperature, 23–25° C. and in the latter case, higher temperatures are typically more effective, e.g., temperatures from 60° C. to about 150° C. Once a minimum temperature for a particular reaction has been found, an increase in that temperature will only serve to increase the rate of the reaction.

In the case of the haloalkylation reaction, it generally requires higher reaction temperatures. Usually, it is necessary to heat the reactants to at least about 60° C. and typically not higher than about 110° C. Preferably, a reaction temperature between 70° C. and 105° C. is desirable. At lower temperatures, the reaction can be sluggish but it is operable. At higher temperatures, the reaction is quicker but it is prone to produce a substantial amount of tertiary and secondary amines.

Both reactions can be effected rapidly if desired, but better yields are obtainable when the reaction times are extended. Hence, the reaction can be effected over any reasonable time period to produce some reaction product, but usually it is desirable to run the reaction for at least ½ hour to obtain a useful yield.

As pointed out in the above table, one of the reactants in forming the polyazamide can contain silicon bonded thereto. Illustrative of such reactants are, e.g.,

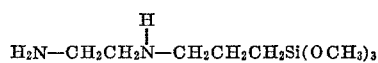
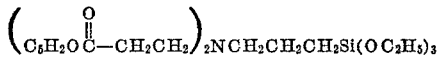
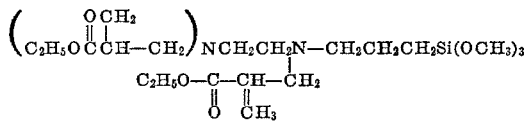
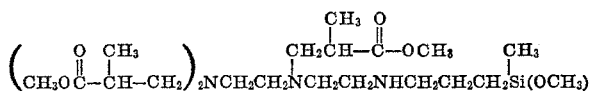
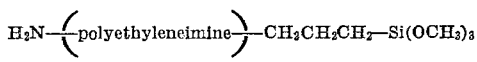
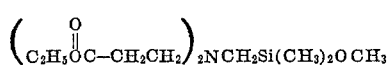
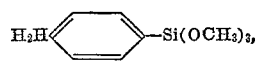
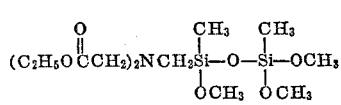

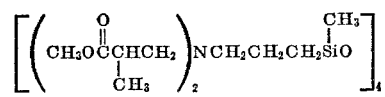
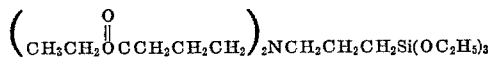
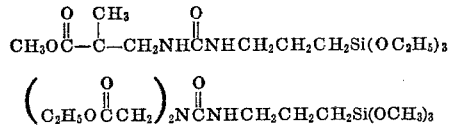

The above compounds containing free amino groups ($-NH_2$) are employable for the Michael addition and haloalkylation reactions, or they may be reacted with the esters formed by these reactions to form the polyazamide structure. Though the silicon moiety can be incorporated by virtue of co-reaction in affecting the Michael addition or haloalkylation reaction, or in the ammonolysis (amidation) reaction to form the polyazamide structure, it can also be incorporated by post treating a polyazamide. This is accomplished by reacting a functional organic silicon compound with a polyazamide.

The Michael addition products are formed by the reaction of an alpha, beta-ethylenically unsaturated carboxylic acid esters and an

containing compound. Illustrative of such esters are the following:

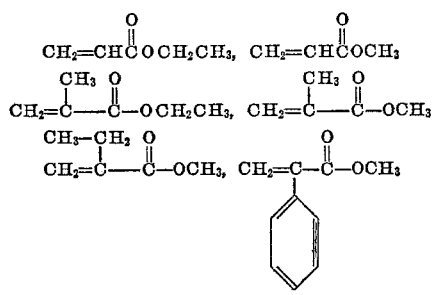

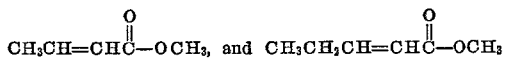

The ester moiety may be derived from any alkanol, preferably one to about four carbon atoms. The haloalkylcarboxylic acid esters suitable for the haloalkylation reaction is any haloalkylcarboxylic acid ester where the alkyl group contains 1 to 3 carbon atoms and the halo group is chlorine, bromine or iodine. Illustrative of such acid esters are the following:

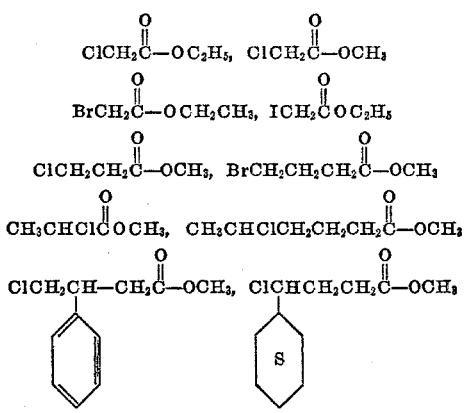

The amines which may be reacted with the above acid ester to achieve the Michael addition or haloalkylation reactions, and thereafter, in the case of the polyamines, with the reaction products to produce the polyazamides, include by way of example, the following:

NH₃, CH₃NH₂, CH₃CH₂NH₂, HOCH₂CH₂NH₂,

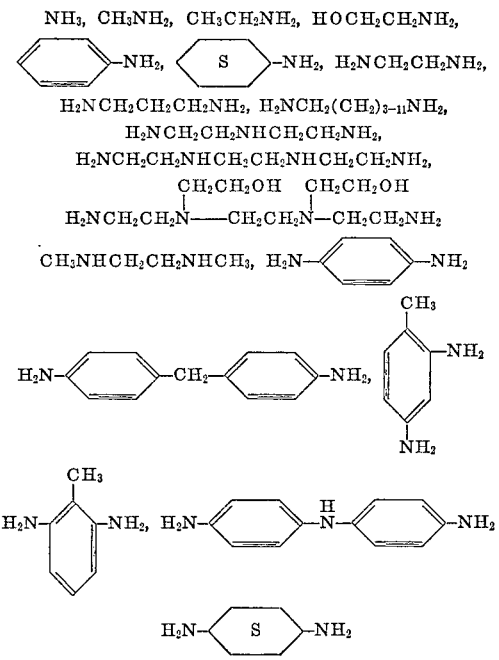

The condensation reaction to effect ammonolysis (amidation) can be simply effected by heating the amino ester of the Michael addition or haloalkylation reactions alone or admixed with a polyamine. The reaction is typically effected neat or in the presence of the alcohol formed by condensation. However, the aforementioned solvents can also be employed in this reaction. The reaction can be effected at temperatures as low as about 20° C. to about 150° C., and higher. However, as would be expected, at lower temperatures, the ammonolysis reaction is slower and the degree of polymerization is usually low. At higher temperatures, the reaction is faster and the degree of polymerization is significantly greater.

When the polyazamide is aliphatic and the number of aliphatic carbon atoms separating the nitrogen atoms from other nitrogen atoms and carboxamide groups is not greater than 4, then the polyazamide is water-soluble. As that number is increased or becomes aromatic, the polyazamide is significantly less water-soluble.

The post treatment of the polyazamides by a functional organic silicon compound can be achieved by either an addition or condensation reaction. The basis of the post treatment is the reaction of a carboxylic acid ester or an >NH of a polyazamide and a functional group of the organic silicon compound capable of adding or condensing with the ester or >NH, as the case may be.

The functional organic silicon compound usable in the post treatment may be a silane or silicate, or a polysiloxane or polysilicate. Though the permutations and combinations of silicon compound and polyazamide post treated are great, each of them possesses a utility predicated upon the nature of the pendent silicon compound and the polyazamide.

When the polyazamide contains pendent silicon which contains multiple water hydrolyzable groups, such as hydrocarbonoxy, acyloxy, amino, ketoximyl, and the like, it can be employed as a coupling agent or adhesion promoter which also acts as a plastic size and, to some degree, as a lubricant and dispersant. One can look at the products of this invention as possessing, in addition to other properties, the characteristics of a surfactant.

The polyazamide backbone is highly polar and the polyazamides which are water soluble are also hygroscopic. Such properties lend surfactant properties to the silicon substituted polyazamides of this invention particularly when the silicon substitution is a hydrophobic moiety such as

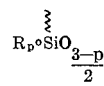

where $p$ is 0, 1 or 2 and $R^o$ is a monovalent hydrocarbon radical bonded to Si by a carbon to Si bond.

The bond of the Si substituent to the polyazamide can be by any organic divalent radical which directly bonds to the polyazamide backbone and to a silicon atom of the Si substituent. The nature of this divalent organic radical is not critical to the invention insofar as product stability is concerned, but in certain circumstances can effect the solubility and utility of the resulting product. The nature of this radical can range, for example, from methylene to high molecular weight polyethylene to oxyethyloxide to poly(oxyethylene) to 1,4-phenylene to 1,4-cyclohexylene to poly-p-xylylene to polycyclopentadienyl.

As the size of the radical increases so does the effect of the radical on the properties of the substituted polyazamide. For example, the telomerization product of the copolymerization of vinyl trimethoxysilane, ethylene and chloroform produces a polymer containing a polyethylene backbone containing terminal chlorine which can be reacted with ammonia to form a polyamine. Such a polyamine can be employed in forming the polyazamide. On the other hand, the telomer can be recated with a polyazamide whereby a terminal chloro group reacts with a secondary amino group of the polyazamide and the telomer becomes a substituent of the polyazamide. Such a polyazamide can be a sizing agent for fibers such as glass fiber, nylon, polypropylene, polyester and other fibers.

The silicon substituent can be introduced from a polyalkyleneoxide, such as

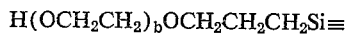

or

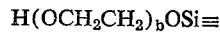

wherein $b$ is 1 or greater, or the silicon substituent can be introduced by a Michael addition from an unsaturated ester of these polyalkyleneoxides, such as

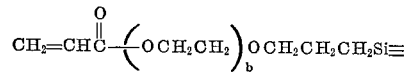

or

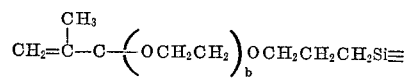

Within the framework of the above, it can be appreciated that the organic radical which joins the pendent silicon moiety to the polyazamide backbone may be any divalent organic radical processing a functionality, other than silicon, which reacts with, and thereby joins to, a carboxylic acid ester group or an amino (this term is intended herein, in the context of linking the pendent silicon, to encompass as well, unsubstituted amido nitrogen) group, and is also bonded directly to Si of the silicon compound. Illustrative of divalent organic groups bonded to N of the polyazamide and Si of the silicon compound include

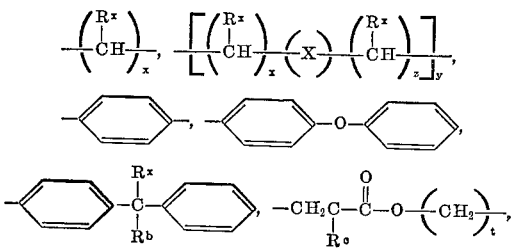

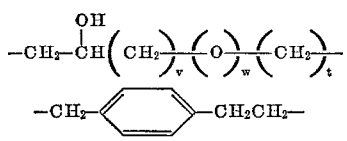

wherein X is oxygen or sulfur; $x$ is at least 1 and may be as large as 18 or larger, but preferably is not greater than about 12; $z$ has the same value as $x$; $R^x$ is hydrogen, alkyl (of 1 to about 18 carbon atoms, preferably not greater than about 8 carbon atoms) and aryl (such as phenyl, benzyl, tolyl, xylyl and the like); $R^x$, $R^b$ and $R^c$ are hydrogen or methyl; $t$ is 1, 3 and 4; $v$ is 0 to about 6, preferably 1 to about 4; $w$ is 0 or 1; $t$ is 1, 3 or 4 when $w$ is 1 and otherwise it is 0; one free valence is bonded to O which in turn is bonded to Si or is directly bonded to Si, and the remaining free valence is bonded to oxygen which in turn is bonded to carbonyl or is bonded directly to amino nitrogen of the polyazamide; and $y$ is 1 to about 20.

Through the divalent organic radical, the silicon compound bonded to the polyazamide backbone may be of a variety of types, such as those characterized by the following:

(I)

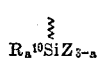

and (II)

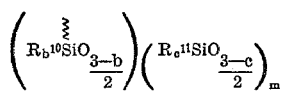

wherein $R^{10}$ and $R^{11}$ are monovalent organic groups bonded to Si by either a carbon to silicon bond or an oxygen to silicon bond, Z is a hydrolyzable group such as alkoxy, aroxy, acyloxy, amino, acyloxy, oximyl and the like, $a$ is 1, 2 or 3, $b$ is 1 or 2, $c$ is 1, 2 or 3, and $m$ is at least 1. Most preferably, $m$ is not greater than about 4,000.

Illustrative of $R^{10}$ and $R^{11}$ are any monovalent organic radical such as *alkyl* (e.g., methyl, ethyl, pentyl, dodecyl, octadecyl, 2-ethylhexyl, and the like), *cycloalkyl* (such as cyclobutyl, cyclohexyl, 4-methylcyclohexyl, and the like), *aryl* (such as phenyl, 2-naphthyl, 2-anthracyl, biphenyl, and the like), *alkaryl* (such as 4-methylphenyl, 2,4-diethylphenyl, 4-dodecylphenyl, and the like), *aralkyl* (such as phenylethyl), *alkenyl* (such as vinyl, allyl, 3-butenyl, oleyl, and the like), *alkadienyl* (such as 1-butadienyl-1,4, 1-octadecatrienyl-9,11,13-, 1-neoprenyl, and the like), *cycloalkenyl* (such as 3-cyclohexenyl), *haloalkyl* (such as chloromethyl, gamma-chloropropyl, 3,3,3-trifluoropropyl, perfluoropropyl); *haloaryl* (such as 4-chlorophenyl, 2,4-dichlorophenyl, chloronaphthyl), *halocycloalkyl* (such as 4-chlorocyclohexyl), *cyanoalkyl* (such as beta-cyanoethyl, gamma-cyanopropyl and the like); *cyanoaryl* (such as 4-cyanophenyl); *cyanocycloalkyl* (such as 4-cyanocyclohexyl, 3-cyanocyclopentyl, and the like); *carboxyalkyl* (such as beta-carboxyethyl, gamma-carboxypropyl, and the like), *carboxyaryl* (such as 4-carboxyphenyl); *carboxycycloalkyl* (such as 4-carboxycyclohexyl, 3-carboxycyclopentyl, and the like); *isocyanatoalkyl* (such as gamma-isocyanatopropyl, delta-isocyanatobutyl, and the like); *isocyanatoaryl* (such as 4-isocyanatophenyl); *isocyanatocycloalkyl* (such as 4-isocyanato-cyclohexyl); *alkyl or aryl carboxyalkyl* (such as beta-methylcarboxyethyl, gamma-phenyl carboxypropyl, and the like); *hydroxyalkyl* (such as hydroxymethyl, gamma-hydroxypropyl, and the like); *hydroxy(polyalkyleneoxy)alkyl* (such as omegahydroxy(polyethyleneoxy)propyl, and the like); *alkenoyloxyalkyl* (such as gamma-acryloyloxypropyl, gamma-methacryloxypropyl, and the like); *epoxyalkyl* (such as 1,2-epoxyethyl, 1,2-epoxypropyl, 1,2-epoxybutyl, and the like); *epoxy alkyloxyalkyl* (such as glycidyloxypropyl); *epoxycycloalkyl* (such as beta-3,4-epoxycyclohexylethyl); *aminoaryl* and *aminoalkyl* (such as aminomethyl, gamma-aminopropyl, delta-aminobutyl, p-aminophenyl, and the like); *alkoxy* (such as for example methoxy, ethoxy, propoxy, dodecyloxy, isopropoxy, and the like); *aroxy* (such as phenoxy, naphthyloxy, biphenyloxy, and the like); *acyloxy* (such as formyloxy, acetyloxy, proprioxy, and the like); any other organo-functional radicals such as *hydroxyalkoxy* (such as beta-hydroxyethoxy, gamma-hydroxypropoxy, and the like); *hydroxyalkoxyalkoxy* (such as beta-hydroxyethoxyethoxy, omega-hydroxy(polyethyleneoxy)ethoxy, omega-hydroxy (poly-1,2-propyleneoxy), and the like), *cyanoalkoxy* (such as beta-cyanoethoxy, beta-cyanohexoxy and the like); *cyanoalkoxyalkoxy* (such as beta-cyanoethoxyethoxy, omega-cyanoethoxy (polyethyleneoxy), omega-cyanoethoxy(poly-1,2-propyleneoxy), and the like); *carboxyalkoxy* (such as beta-carboxyethoxy, beta-carboxyhexoxy and the like); *haloalkoxy* (such as chloromethoxy, bromoethoxy, perfluoropropoxy, and the like); and the like.

Illustrative of hydrolyzable groups, i.e., Z above, are alkoxy, acyloxy, aryloxy, amino, and the like, as for example, methoxy, ethoxy, propoxy, dodecyloxy, isopropoxy, and the like; phenoxy, naphthyloxy, biphenyloxy, and the like, alkylamino and arylamino (such as methylamino, diethylamino, phenylamino, and the like), formyloxy, acetyloxy, proprioxy, and the like, any organofunctional radicals such as hydroxyalkoxy (such as beta-hydroxyethoxy, gamma-hydroxypropoxy, and the like); hydroxyalkoxyalkoxy (such as beta-hydroxyethoxyethoxy, omega-hydroxy(polyethyleneoxy)ethoxy, omega-hydroxy (poly-1,2-propyleneoxy), and the like); cyanoalkoxy (such as beta-cyanoethoxy, beta-cyanohexoxy and the like); cyanoalkoxyalkoxy (such as beta-cyanoethoxyethoxy, omega-cyanoethoxy (polyethyleneoxy), omega-cyanoethoxy(poly-1,2-propyleneoxy), and the like); carboxyalkoxy (such as beta-carboxyethoxy, beta-carboxyhexoxy and the like); haloalkoxy (such as chloromethoxy, bromoethoxy perfluoropropoxy, and the like); and the like.

The divalent organic radical defined above is bonded to the Si of Formulae I and II at the unsatisfied valence. It is derived from a monovalent organic group so bonded to Si and which possesses an organofunctional group that reacts with amino, as previously defined, and the carboxylic acid ester group. Such organofunctionality is capable of condensation with amino or carboxylate radicals, or alkylation addition of amino radicals, or addition to amino radicals. The organofunctionality may be, e.g.,

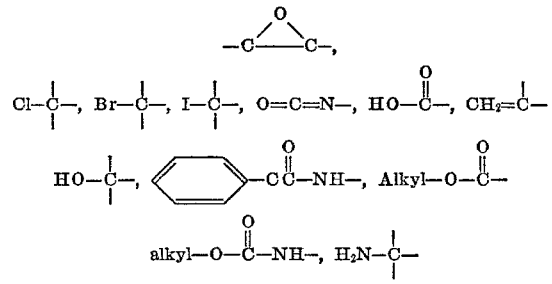

wherein the free valences are bonded to hydrogen, carbon or Si, provided not more than one free valence is bonded to Si.

Illustrative of organofunctional substituted silicon compounds reactable with the polyazamides are, e.g.,

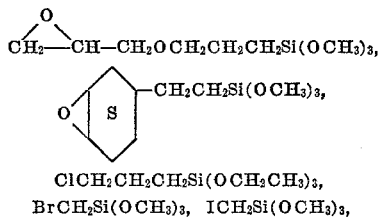

$ClCH_2CH_2CH_2Si(OCH_2CH_3)_3$,
$BrCH_2Si(OCH_3)_3$, $ICH_2Si(OCH_3)_3$,

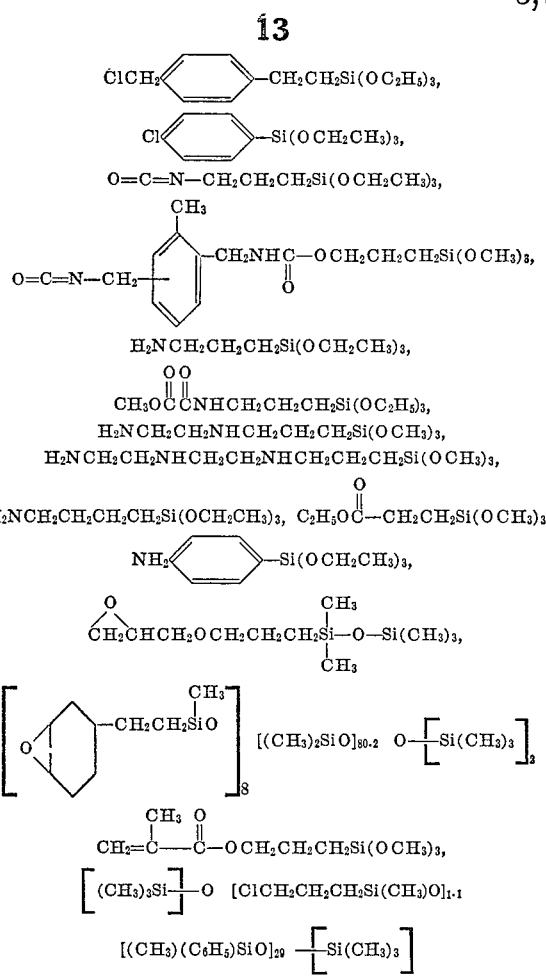

The reaction of the organofunctional silicon compounds with the polyazamide is typically at the lowest temperature at which reaction is obtainable at reasonable rates. Usually the temperature will be at least about ambient room temperature (about 20° C. to 25° C.) up to the decomposition temperature of the polyazamide, about 200° C. The nature of the organofunctionality will determine the appropriate reaction temperature, e.g., isocyanato and methacrylato or acrylato functionalities will react at low temperatures, from about 20° C. to about 100° C., while haloalkyl and epoxy functionalities will normally require higher temperatures, from about 40° C. to about 150° C., and esterifying or amidation reaction groups will generally require even higher temperatures, from 70° C. to about 180° C. The reactions are operative at atmospheric pressure, though subatmospheric and superatmospheric pressures are employable. It is preferred that the esterifying and amidation reactions are carried out at sub to atmospheric pressure conditions. The reactions can be carried out neat but inert solvents are employable.

Though this invention has been described with respect to a plurality of details thereof, it is not intended that this invention shall be limited thereto. The following examples are considered to be illustrative only and should not be regarded as limiting this invention.

All polyazamide solutions defined in the examples are in methanol, unless otherwise specified. Any polyazamide in the examples whose manufacture is not specifically defined is made by the procedure of Example 1. In the examples, "Me" means methyl and "Et" means ethyl.

EXAMPLE 1

Into a 2 liter, 3-necked flask equipped with mechanical stirrer, dropping funnel, thermometer, distillation head with receiver and surrounded by a wet ice bath are charged 180 g. (3.0 moles) of ethylenediamine. Over a period of 2 hours, 600 g. (6.0 moles) of ethyl acrylate are added with vigorous stirring while maintaining the reaction temperature below about 25° C. After standing overnight, an additional 200 g. (3.34 moles) of ethylenediamine are added to 723.7 g. of the latter and the mixture is heated from 140 to 155° C. over a period of six hours accompanied by the smooth distillation of about 6 moles of ethanol. The highly viscous polymeric product is stripped to 155° C. under a vacuum of about 1 mm. of mercury pressure and subsequently diluted with an equal weight of methanol to facilitate handling. There results a 50 wt.-percent clear light yellow methanol solution of high viscosity polyazamide having a titratable amine equivalent of 274 g. per mole.

EXAMPLE 2

Into a 500 ml., 3-necked flask equipped with mechanical stirrer, thermometer, dropping funnel, distillation head with receiver and protected from the atmosphere by a dry nitrogen purge of the exit port are charged 171.7 g. of the polyazamide solution prepared in Example 1. The stirred solution is heated to 95° C. while removing a portion of the methanol solvent and 14.1 g. (.07 mole) of 3-chloropropyltrimethoxysilane are added dropwise to the pot over about 2 minutes. Stirring at 95° C. for an additional hour completes the alkylation of amino nitrogen by the silane with the accompanying formation of amine hydrochloride groups in the trimethoxysilylpropylated polyazamide. Near quantitative reaction of amino groups with silane is confirmed by the formation of near theoretical (0.71 mole/kg.) chloride ion and silicon by analysis of a reconstituted 50 wt.-percent methanol solution.

EXAMPLE 3

Using the procedure of Example 2, 343.4 g. of a 50 wt.-percent methanol solution of polyazamide, produced from 1,3 propane diamine and ethyl acrylate, are reacted with 28.3 g. (0.143 mole) of 3-chloropropyltrimethoxysilane to produce a 53.7 wt.-percent solution of a trimethoxysilylpropylated polyazamide hydrochloride that is also water soluble and possesses the same chloride ion and silicon content as the product of Example 2.

EXAMPLE 4

Prepared as described in Example 2, 171.7 g. of 50 wt.-percent solution of polyazamide, produced from methyl methacrylate and ethylene diamine, are reacted with 14.1 g., .07 mole, of 3-chloropropyltrimethoxysilane to produce a 53.8 wt.-percent solution of the trimethoxysilylpropylated polyazamide hydrochloride that is light amber in color, completely water soluble and that analyzes near theoretical (0.71 mole/kg.) chloride and silicon.

EXAMPLE 5

Prepared as described in Example 2, 343.4 g. of a 50 wt.-percent solution of polyazamide produced from methyl methacrylate and 1,3-propane diamine, are reacted with 28.3 g., 0.14 mole, of 3-chloropropyltrimethoxysilane at 90° C. for 30 minutes to produce a 53.8 wt.-percent solution of the corresponding trimethoxysilylpropylated polyazamide hydrochloride which is similarly of light amber color, completely soluble in water and shows the anticipated chloride ion and silicon analysis of 0.71 mole/kg.

EXAMPLE 6

In the same manner as described in Example 2, 278.8 g. of 50 wt.-percent polyazamide solution, produced from ethyl acrylate and ethylenediamine, are reacted with 10.6 g. of 3-chloropropyltrimethoxysilane to produce a 51.9 wt.-percent solution of the corresponding trimethoxysilylpropylated polyazamide hydrochloride, having near theoretical (0.357 mole/kg.) chloride ion and silicon.

EXAMPLE 7

In the same manner as described in Example 3, 278.8 g. of 50 wt.-percent polyazamide solution, produced from ethyl acrylate and 1,3-propane diamine, are reacted with 10.6 g. of 3-chloropropyltrimethoxysilane to obtain a 51.9 wt.-percent solution of the corresponding trimethoxysilylpropylated polyazamide hydrochloride, having the anticipated structure and near theoretical (0.357 mole/kg.) of chloride ion and silicon.

EXAMPLE 8

In the same manner as described in Example 4, 278.8 g. of 50 wt.-percent polyazamide solution, produced from methyl methacrylate and ethylenediamine, are reacted with 10.6 g. of 3-chloropropyltrimethoxysilane to obtain a 51.9 wt.-percent solids solution of the trimethoxysilylpropylated hydrochloride derivative having near theoretical (0.357 mole/kg.) of chloride ion and silicon.

EXAMPLE 9

In the same manner as described in Example 5, 278.8 g. of 50 wt.-percent polyazamide solution, produced from methyl methacrylate and 1,3-propane diamine, are reacted with 10.6 g. of 3-chloropropyltrimethoxysilane to produce a similar derivative having one half the concentration of chloride ion and silicon in a solution similarly reconstituted to 51.9% solids.

EXAMPLE 10

In the same manner as described in Example 2, 286.8 g. of the same 50 wt.-percent polyazamide solution, produced from ethyl acrylate and ethylenediamine, are reacted with 56.6 g. of 3-chloropropyltrimethoxysilane to produce a similarly modified derivative having 1.44 moles/kg. of both chloride ion and silicon. The product is reconstituted to 58.4 wt.-percent solids with the ethanol removed prior to reaction with the silane. The product is readily soluble in water.

EXAMPLE 11

In the same manner as described in Example 3, 286.8 g. of the same 50 wt.-percent polyazamide solution, produced from ethyl acrylate and 1,3-propane diamine, are reacted with 56.6 g. of 3-chloropropyltrimethoxysilane to produce a 58.4 wt.-percent solution of similarly modified derivative having 1.43 moles/kg. of silicon and 1.37 moles/kg. of chloride ion.

EXAMPLE 12

In the same manner as described in Example 2, 286.8 g. of 50 wt.-percent polyazamide solution, produced from ethylenediamine and methyl methacrylate, are reacted with 56.6 g. of 3-chloropropyltrimethoxysilane to produce a 58.4 wt.-percent solution of similarly modified polyazamide having 1.42 moles/kg. of silicon and 1.39 moles/kg. chloride ion.

EXAMPLE 13

In the same manner as described in Example 2, 286.8 g. of 50 wt.-percent polyazamide solution, produced from methyl methacrylate and 1,3-propane diamine, are reacted with 56.6 g. of 3-chloropropyltrimethoxysilane to produce a 58.4 wt.-percent solution of silylated polyazamide hydrochloride having 1.44 moles/kg. silicon and 1.39 moles/kg. chloride ion.

EXAMPLE 14

In much the same manner as described in Example 2, 100 g. of 71.3 wt.-percent polyazamide in ethanol, produced by stoichiometric reaction of ethyl acrylate and ethylenediamine, are reacted with 12.8 g. of 3-chloroisobutyltrimethoxysilane for 3 hours at from 103° to 94° C. and reconstituted with methanol to 50 wt.-percent total solids. The resulting trialkoxysilylisobutylated polyazamide hydrochloride solution analyzes for .36 mole/kg. chloride ion, indicating quantitative alkylation with silane is achieved. As is also the case for the products of the preceding examples, the product is a light amber color, clear, water-soluble solution.

EXAMPLE 15

(a) Into a 5 liter, 3-necked flask outfitted with mechanical stirrer, thermometer, 1 liter addition funnel, the exit port protected from the atmosphere by a dry nitrogen by-pass and the reaction flask immersed in a water-ice bath is charged 685.5 g. of 96.7 wt.-percent ethylenediamine (11.0 moles) containing 3.3 wt.-percent of analyzed water. The stirred contents are cooled to 10° C. whereupon, the slow addition of 2202.6 g. (22.0 moles) of anhydrous ethyl acrylate is made by means of the addition funnel over a period of 6 hours while holding the reaction temperature at 15±3° C. The reaction mixture is allowed to warm to room temperature and stand for 64 hours. Calc. for $C_{12}H_{24}N_2O_4$—7.68 moles of total amino groups per kg. Found 7.65.

(b) Into a 2 liter, 3-necked flask equipped with mechanical stirrer, thermometer, water cooled reflux condenser, heating mantle and with the condenser unit protected from the atmosphere by a dry nitrogen by-pass tube is charged 1345.5 g. of the reaction mixture of (a) of this example and 317.8 g. of 98% pure (2 wt.-percent $H_3O$), 5.17 moles, of ethylenediamine. The stirred mixture is heated to 120° C. and held at this limit for 4 hours. A gentle reflux of the ethanol of reaction is observed after about 3 hours. Upon cooling the total titratable nitrogen of the polyazamide-ethanol solution is 9.02 moles/kg., indicating partial condensation of primary amino groups and ester groups has occurred. After seven days at room temperature the amino titer is 7.71 moles/kg. and the viscosity is 420.5 cps. After 35 additional days at room temperature the amino titer is 6.29 moles/kg. and the viscosity is stabilized at 2,133 cps./25° C. The theoretical amine content for complete reaction of ester groups is —6.25 moles/kg. Found —6.29.

EXAMPLE 16

In the same manner as described in Example 2, 350 g. of the polyazamide solution prepared in Example 15(b) are reacted with 39.8 g., 0.2 mole, of 3-chloropropyltrimethoxysilane to produce a 74 wt.-percent solids solution of trimethoxysilylpropylated polyazamide hydrochloride. After standing at room temperature for three days, the viscosity is 4660 cps. at 25° C.

EXAMPLE 17

Into a 500 ml. 3-necked flask outfitted with mechanical stirrer, dropping funnel, thermometer, heating mantle and protected from the atmosphere by a dry nitrogen sparge at the exit port is charged 350 g. of the polyazamide solution prepared in Example 15(b). While stirring at room temperature, 51.7 g., 0.21 mole of

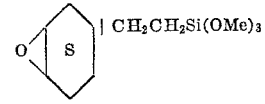

beta - (3,4 - epoxycyclohexyl)-ethyltrimethoxysilane, are added over about 3 minutes. The stirred mixture is heated to 80° C. for about 5 minutes, cooled and diluted to 50 wt.-percent solids by dilution with methanol. The viscosity of the latter alcohol solution of trimethoxysilylalkylated polyazamide is 22 cps./25° after standing three days at room temperature and 202 cps./25° after standing a total of 75 days, indicating siloxane formation.

EXAMPLE 18

In the same manner as described in Example 17, 350 g. of the polyazamide solution prepared in Example 15(b) are reacted with 49.0 g., 0.21 mole, of gamma-glycidoxypropyltrimethoxysilane to produce a 50 wt.-percent alcohol (ethanol and methanol) solution of the corresponding trimethoxysilylalkylated polyazamide having a viscosity of 26 cps. after 3 days standing and 190 cps. after 75 days.

EXAMPLE 19

In the same manner as described in Example 17, 776 g. of the polyazamide solution prepared in Example 15(b) are reacted with 224 g., 0.7 mole, of

and subsequently diluted with methanol to produce a 25 wt.-percent mixed alcohol solution of oxamide linked triethoxysilylpropylated polyazamide having a viscosity of 4 cps. after 3 days and 5 cps. after 21 days.

EXAMPLE 20

Into a 5 liter, 3-necked round bottom flask equipped with mechanical stirrer, dropping funnel, thermometer, distillation head with water condenser and 2-liter receiver, heating mantle and protected from the atmosphere by a dry nitrogen by-pass at the exit port of the system, are charged 1,335 g., 22.0 moles, of ethylenediamine. With moderate stirring, 2,002 g., 20.0 moles, of ethyl acrylate is added at about 12 ml./min. by means of the dropping funnel over a period of three hours. The temperature of the reaction mixture rises exothermically from 28° C. to a maximum of about 100° C. during the addition. The reaction mixture is subsequently heated to and held at 120° C. for four hours, followed by an additional heating period of four hours at 140° C. Ethanol is removed at the head, beginning during the last half hour of the 120° C. heating period and continuing through most of the 140° C. period. The resulting 2,462 g. of clear, light, amber, viscous polyazamide are cooled to about 70° C. and diluted with 938 g. of methanol.

Properties observed for the polyazamide-alcohol solution are:

| | |
|---|---|
| Wt.-percent solids | 70.0 |
| Wt.-percent EtOH | 2.3 |
| Wt.-percent MeOH | 27.6 |
| Total amine (moles/kg.) | 6.6 |
| 3° amine | 1.1 |

Brookfield visc. (cps./T°)=296/33°, 580/25°.

EXAMPLE 21

In the same manner as described in Example 2:

(a) 100 g. of the polyazamide solution produced in Example 20 are reacted with 10.3 g., 0.05 mole, of $ClCH_2C(CH_3)HCH_2SiCH_3(OCH_3)_2$ to produce a 73 wt.-percent solution of methyldimethoxysilylisobutylated polyazamide hydrochloride that contains 0.45 mole/kg. of silicon and chloride ion and is completely water soluble.

(b) 100 g. of the polyazamide solution produced in Example 20 are reacted with 19.1 g., 0.1 mole, of $ClCH_2C(CH_3)HCH_2Si(CH_3)_2OCH_3$ to produce a 74.5 wt.-percent solution dimethylmethoxysilylisobutylated polyazamide hydrochloride that contains 0.84 mole/kg. of silicon and chloride ion and is completely water soluble.

(c) 100 g. of the same polyazamide solution produced in Example 20 are reacted with 8.5 g., 0.05 mole, of $ClCH_2Si(OCH_3)_3$ to produce a 72 wt.-percent solution of trimethoxysilylmethylated polyazamide hydrochloride that contains 0.46 mole/kg. of analyzed silicon and chloride ion and is completely soluble in water.

(d) 100 g. of the same polyazamide solution produced in Example 20 are reacted with 15.5 g., 0.1 mole, of $ClCH_2SiCH_3(OCH_3)_2$ to produce a 74 wt.-percent solution of methyldimethoxysilylmethylated polyazamide hydrochloride that contains 0.87 mole/kg. of analyzed silicon and chloride ion and is completely water soluble.

(e) 100 g. of the same polyazamide solution produced in Example 20 are reacted with 27.7 g., 0.2 mole, of $ClCH_2Si(CH_3)_3OCH_3$ to produce a 76 wt.-percent solution of dimethylmethoxysilylmethylated polyazamide hydrochloride containing 1.56 moles/kg. of analyzed silicon and chloride ion and is completely water soluble.

(f) 100 g. of the same polyazamide solution produced in Example 20 are reacted with 24.7 g., 0.1 mole, of $p\text{-}ClCH_2C_6H_4Si(OCH_3)_3$ to produce a 76 wt.-percent solution of trimethoxysilylphenylmethylated polyazamide hydrochloride containing 0.8 mole/kg. of analyzed silicon and chloride ion, with good water solubility.

(g) 100 g. of the same polyazamide solution produced in Example 20 are reacted with 28.9 g., 0.1 mole, of the mixed isomers of $ClCH_2C_6H_4C(CH_3)HCH_2Si(OCH_3)_3$ to produce a 76.5 wt.-percent solution of the corresponding trimethoxysilylalkaralkylated polyazamide hydrochloride, containing 0.78 mole/kg. of analyzed silicon and chloride ion and good water solubility.

(h) 100 g. of the same polyazamide solution produced in Example 20 are reacted with 27.5 g., 0.1 mole, of the mixed isomers of $ClCH_2C_6H_4C_2H_4Si(OCH_3)_3$ to produce a 76.5 wt.-percent solution of the corresponding trimethoxysilylalkaralkylated polyazamide hydrochloride containing 0.78 mole/kg. of analyzed silicon and chloride ion and good water solubility.

(i) 100 g. of the same polyazamide solution produced in Example 20 are reacted with 59 g., 0.3 mole of $ClCH_2Si(CH_3)_2OSi(CH_3)_3$ to produce an 81 wt.-percent homogeneous solution of polyazamide hydrochloride having 2.33 moles/kg. of the contained amino groups modified with pendent $-CH_2Si(CH_3)_2OSi(CH_3)_3$ groups. The resulting polyazamide-silicone copolymer hydrochloride is readily dispersed in water with appreciable foaming.

(j) 100 g. of the same polyazamide produced in Example 20 are reacted with 58 g., 0.2 mole of $$[(CH_3)_3Si]_2O[OSi(CH_3)(CH_2)_3Cl]$$

to produce an 80.8 wt.-percent homogeneous solution of polyazamide hydrochloride having 1.56 moles/kg. of amino groups modified with pendent $$[(CH_2)_3Si(CH_3)O]O[Si(CH_3)_3]_2$$

groups. The resulting polyazamide-silicone copolymer hydrochloride is readily dispersed in water with considerable foaming.

(k) 100 g. of the same polyazamide produced in Example 20 are reacted with 59 g. of a copolymeric silicone equilibrate of the average composition $$[ClCH_2C(CH_3)HCH_2Si(OCH_3)O]_2[(CH_3)_2SiO]_{100}$$

to produce an 81 wt.-percent solution of polyazamide-silicone copolymer hydrochloride of very high viscosity that is dispersed in water by vigorous agitation.

(1) In the same manner as described in Example 17, 100 g. of the polyazamide solution prepared in Example 20 is reacted with 33.7 g., 0.1 mole of

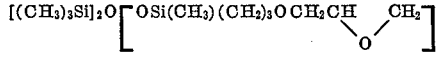

to produce a 77.5 wt.-percent solution of polyazamide-silicone copolymer containing 32.3 wt.-percent, on a solvent free basis, of

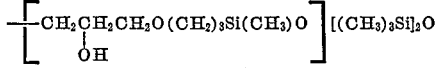

pendant groups, convalently bonded to amino nitrogen, which when dispersed in water shows good foaming properties.

EXAMPLE 20

A mixture of 0.3 g. of the polyazamide solution prepared in Example 20, and 200 ml. of a 3 wt.-percent solids aqueous emulsion of

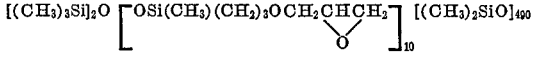

shows utility as a finishing solution to impart water repellency to a variety of fabric substrates. Finishes subjected to a mild heat cure are crosslinked by the multiplicity of epoxy and amino groups that undergo the same reaction observed in Example 21(e).

EXAMPLE 23

In the same manner as described in Example 17, 100 g. of the polyazamide solution prepared in Example 20 are reacted with 33.7 g. of

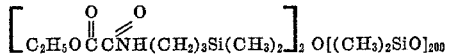

to produce a 77 wt.-percent solution of polyazamide-silicone copolymer containing 32 wt.-percent, on a solvent free basis, of

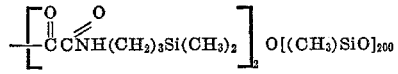

bonded covalently to the polyazamide through oxamide linkages. Dispersion in water is readily achieved with simple mixing.

EXAMPLE 24

Into a 100 l. three-necked flask outfitted with mechanical stirrer, thermometer, dropping funnel and heating mantle are charged 5.4 g. of the polyazamide prepared in Example 1, containing 0.02 mole of NH at 50 wt.-percent solids in methanol. While stirring at room temperature, 7.6 g., 0.02 mole, of

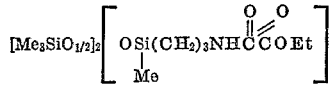

are added dropwise over 5 minutes and the mixture heated to a final condition of 120° C./1 mm. Hg pressure to remove the methanol solvent and ethanol of reaction, and to product 9.3 g. of silicone polyazamide copolymer in quantitative yield containing 47 wt.-percent of oxamide linked silicone modification.

Four parts of the above silicone-polyazamide copolymer are mixed with 55 parts propylene oxide adduct polyether of 2,4,6-hexanetriol having a hydroxyl number of 240, 25 parts of a polycaprolactone diol having a molecular weight of 500, and 20 parts of propylene oxide adduct polyether of glycerine having a hydroxyl number of 240. The total mixture is stirred for 10 minutes on a Hobart Planetary mixer at medium speed, using a wire cage agitator. There resulted a stiff froth with a density of 17.2 lb./ft.$^3$.

EXAMPLE 25

In accordance to the procedure of Example 24, 38 g. of

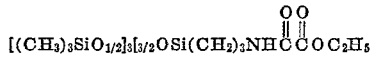

are reacted with 27 g. of the polyazamide prepared in Example 1, containing 0.1 mole of amino functionality, to produce 60 g. of a silicone-polyazamide copolymer containing 55 wt.-percent of oxamide linked silicone, and which possess comparable frothing properties to the product of Example 24.

EXAMPLE 26

In the same manner as described in Example 17, 100 g. of the polyazamide solution prepared in Example 20 are reacted with 34 g. of

to produce a 77 wt.-percent solution of highly viscous and homogeneous silicone-polyazamide copolymer, containing 32.5 wt.-percent of amide linked silicone moiety.

EXAMPLE 27

In the same manner as described in Example 24, 39 g., 0.1 mole, of

are reacted with 27 g. of the polyazamide prepared in Example 1 to produce 66 g. of silicone-polyazamide copolymer containing 59 wt. percent of urea linked silicone moiety, with a final solids content of 70 wt. percent.

EXAMPLE 28

Into a 2 liter, 3-necked flask equipped with mechanical stirrer, dropping funnel, thermometer, reflux condenser and protected from the atmosphere by a dry nitrogen purge at the exit port are charged 242.8 g., 4.0 moles, of ethylenediamine (99% pure). The stirred diamine is cooled to 15° C. and 801 g., 8.0 moles, of ethyl acrylate are added over a period of 2.5 hours while holding the reaction temperature to 15±5° C. by means of external cooling. The reaction mixture is stirred an additional 18 hr. at room temperature before proceeding.

Into a 1 liter, 3-necked flask equipped with mechanical stirrer, thermometer, reflux condenser, thermo-watch and protected from the atmosphere by dry nitrogen are charged 308.5 g. of the ethylenediamine-ethyl acrylate addition product prepared above plus 100 g., 0.24 mole,

and 101.1 g., 1.66 moles, of additional ethylenediamine. The stirred mixture is heated to a limit of 120° C. for 26.5 hr., resulting in a final pot temperature of 94° C. due to formation of ethanol of reaction. There results a triethoxysilylpropylated polyazamide containing 0.63 mole/kg. of polymer of the amide linked unit

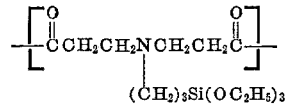

The total titratable amine content of the resulting solution is 5.69 moles/kg. and the measured viscosity is 1,335 cps. at 25° C. Complete water solubility of the product is observed.

EXAMPLE 29

In the same manner as described in Example 28, 324.5 g. of the ethylene diamine-ethyl acrylate addition product prepared in Example 28 are reacted with 100 g., 0.24 mole, of

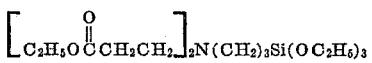

plus 90.0 g., 1.48 moles of ethylenediamine to produce a similar triethoxysilylpropylated polyazamide containing 0.65 mole/kg. of amide linked units

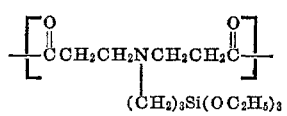

The total titratable amine content of the resulting solution is 5.64 moles/kg. and the measured viscosity is 1,317 cps. at 25° C.

EXAMPLE 30

A 50 wt. percent methanolic solution of a modified polyazamide prepared according to Example 2 is used to prepare a water solution containing 1 wt. percent solids. The water solution is used to finish twelve seven-inches wide swatches of 181–112 heat-cleaned glass fabric. At a 50 wt. percent wet pickup, 0.5 wt. percent solids, based on fabric weight, is deposited on the glass surface. All swatches are then air-dried for 20 min. followed by a 2.5 min. heat-set at 275° F. The finished fabric is then impregnated with an epoxy resin of the following formulation:

| | G. |
|---|---|
| Polyglycidylether of bisphenol A [1] | 300 |
| meta-Phenylenediamine | 45 |

[1] Epoxy assay—180–195; Color (Gardner 1933)—2 max.; Visc. (cps. at 77° F.) 11,000–13,500; Spec. gravity at 77° F. is 1.15–1.17.

The epoxy laminate is pressed to stops for 30 min. at 250° F. using Tedlar as a release film and then post-cured for 60 min. in a 392° F. oven. The laminate is cut in ½" x 4" test specimens with the 4" dimension parallel to the fabric warp direction and tested for flexural strength, both initially and after immersion in boiling water, according to ASTM specification D-790 using a Baldwin-Tate Tester.

The laminate has an 0.5 wt. percent loading of finish, based on fabric weight, and a thickness of 0.124 inch. The test specimens show a water absorption of 1.33% after 72 hours in boiling water, an initial flexural strength of 71,700 p.s.i. and a flexural strength of 58,000 p.s.i. after 72 hours in boiling water. By comparison, a laminate prepared from heat-cleaned fabric has an initial flexural strength of 73,000 p.s.i. and a flexural strength of 29,700 p.s.i. after 72 hours in boiling water. Further, a laminate prepared from A-1100 (gamma-aminopropyltriethoxysilane (product of Union Carbide Corporation)) silane-finished glass fabric has an initial flexural strength of 72,300 p.s.i. and a flexural strength of 53,400 p.s.i. after 72 hours in boiling water. A laminate prepared from glass cloth finished with an unmodified polyazamide prepared according to Example 1 has an initial flexural strength of 68,500 p.s.i. and a flexural strength of 33,500 p.s.i. after 72 hours in boiling water.

EXAMPLE 31

Similarly, an epoxy resin laminate is prepared and tested as described in Example 30. The glass finish in this case consists of a modified polyazamide prepared according to Example 3.

The laminate has a thickness of 0.125 inch. The test specimens show a water absorption of 1.42% after 72 hr. in boiling water, an initial flexural strength of 74,400 p.s.i. and a flexural strength of 54,600 p.s.i. after 72 hr. in boiling water. By comparison, a laminate prepared from heat-cleaned fabric has an initial flexural strength of 73,000 p.s.i. and a flexural strength of 29,700 p.s.i. after 72 hr. in boiling water. In comparison, a laminate prepared from A-1100 silane-finished glass fabric has an initial flexural strength of 72,300 p.s.i. and a flexural strength of 53,400 p.s.i. after 72 hr. in boiling water and a laminate prepared from glass cloth finished with an unmodified polyazamide prepared according to Example 1 has an initial flexural strength of 68,500 p.s.i and a flexural strength of 33,500 p.s.i. after 72 hr. in boiling water.

EXAMPLE 32

An epoxy resin laminate is prepared and tested as described in Example 30. The glass finish in this case consists of the modified polyazamide of Example 4.

The laminate has a thickness of 0.120 inch. The test specimens show a water absorption of 1.12% after 72 hr. in boiling water, an initial flexural strength of 71,700 p.s.i. and a flexural strength of 58,500 p.s.i. after 72 hr. in boiling water.

By comparison, a laminate prepared from heat-cleaned fabric has an initial flexural strength of 73,000 p.s.i. and a flexural strength of 29,700 p.s.i. after 72 hr. in boiling water. Further, a laminate prepared from A-1100 silane-finished glass fabric has an initial flexural strength of 72,300 p.s.i. and a flexural strength of 53,400 p.s.i. after 72 hr. in boiling water. A laminate prepared from galss cloth finished with an unmodified polyazamide prepared according to Example 1 has an initial flexural strength of 68,500 p.s.i. and a flexural strength of 33,500 p.s.i. after 72 hr. in boiling water.

EXAMPLE 33

An epoxy resin laminate is prepared and tested as described in Example 30. The glass finish in this case consists of the modified polyazamide of Example 5.

The laminate has a thickness of 0.122 inch. The test specimens show a water absorption of 1.24% after 72 hr. in boiling water, an initial flexural strength of 70,000 p.s.i. and a flexural strength of 56,500 p.s.i. after 72 hr. in boiling water.

By comparison, a laminate prepared from heat-cleaned fabric has an initial flexural strength of 73,000 p.s.i. and a flexural strength of 29,700 p.s.i. after 72 hr. in boiling water. A laminate prepared from A-1100 silane-finished glass fabric has an initial flexural strength of 72,300 p.s.i. and a flexural strength of 53,400 p.s.i. after 72 hr. in boiling water. Further a laminate prepared from glass cloth finished with an unmodified polyazamide prepared according to Example 1 has an initial flexural strength of 68,500 p.s.i. and a flexural strength of 33,500 p.s.i. after 72 hr. in boiling water.

EXAMPLE 34

An epoxy resin laminate is prepared and tested as described in Example 30. The glass finish in this case consists of the modified polyazamide of Example 6.

The laminate has a thickness of 0.122 inch. The test specimens show a water absorption of 1.31% after 72 hr. in boiling water, an initial flexural strength of 68,800 p.s.i. and a flexural strength of 62,900 p.s.i. after 72 hr. in boiling water.

By comparison, a laminate prepared from heat-cleaned fabric has an initial flexural strength of 73,000 p.s.i. and a flexural strength of 29,700 p.s.i. after 72 hr. in boiling water. Further, a laminate prepared from A-1100 silane-finished glass fabric has an initial flexural strength of 72,300 p.s.i. and a flexural strength of 53,400 p.s.i. after 72 hr. in boiling water. A laminate prepared from glass cloth finished with an unmodified polyazamide prepared according to Example 1 has an initial flexural strength of 68,500 p.s.i. and a flexural strength of 33,500 p.s.i. after 72 hr. in boiling water.

EXAMPLE 35

An epoxy resin laminate is prepared and tested as described in Example 30. The glass finish in this case consists of the modified polyazamide of Example 10.

The laminate has a thickness of 0.124 inch. The test specimens show a water absorption of 1.67% after 72 hr. in boiling water, an initial flexural strength of 72,100 p.s.i. and a flexural strength of 52,700 p.s.i. after 72 hr. in boiling water.

By comparison, a laminate prepared from heat-cleaned fabric has an initial flexural strength of 73,000 p.s.i. and a flexural strength of 29,700 p.s.i. after 72 hr. in boiling water. A laminate prepared from A-1100 silane-finished glass fabric has an initial flexural strength of 72,300 p.s.i. and a flexural strength of 53,400 p.s.i. after 72 hr. in boiling water. Further, a laminate prepared from glass cloth finished with an unmodified polyazamide prepared according to Example 1 has an initial flexural strength of 68,500 p.s.i. and a flexural strength of 33,500 p.s.i. after 72 hr. in boiling water.

EXAMPLE 36

The procedure of Example 30 is repeated with a glass finish of the modified polyazamide of Example 16.

The laminate has a thickness of 0.121 inch. The test specimens show a water absorption of 1.24% after 72 hr. in boiling water, an initial flexural strength of 74,800 p.s.i. and a flexural strength of 57,700 p.s.i. after 72 hr. in boiling water.

EXAMPLE 37

A 50 wt.-percent methanolic solution of the modified polyazamide of Example 2 is used to finish glass fabric as described in Example 30. A dry laminate is then prepared by alternating eleven plies of the finished glass fabric with twelve plies of 0.010 inch thick polyvinyl chloride film. The dry sandwich is placed in a press preheated to 350° F. and molded for 20 min. using sufficient pressure to make reproducible laminates without excessive skewing.

The laminate has an 0.5% loading of finish, based on fabric weight, and a thickness of 0.176 inch. The test specimens, obtained and tested as described in Example 30, show a water absorption of 0.65% after 16 hrs. in 122° F. water, an initial flexural strength of 25,300 p.s.i., an initial tangential modulus of 1,590,000 p.s.i., a flexural strength of 23,700 p.s.i. after 16 hrs. in 122° F. water and a tangential modulus of 1,370,000 after 16 hr. in 122° F. water.

By comparison, a laminate prepared from heat-cleaned fabric has an initial flexural strength of 14,100 p.s.i., an initial tangential modulus of 1,020,000 p.s.i., a flexural strength of 12,200 p.s.i. after 16 hr. in 122° F. water and a tangential modulus of 960,000 p.s.i. after 16 hr. in 122° F. water. Further, a laminate prepared from glass cloth finished with an unmodified polyazamide prepared according to Example 1, has an initial flexural strength of 14,500 p.s.i., an initial tangential modulus of 1,030,000 p.s.i., a flexural strength of 12,900 p.s.i. after 16 hr. in 122° F. water and a tangential modulus of 790,000 after 16 hr. in 122° F. water.

EXAMPLE 38

A polyvinyl chloride lamniate is prepared and tested as described in Example 37. The glass finish in this case consists of the modified polyazamide of Example 4.

The laminate has a thickness of 0.174 inch. Test specimens show a water absorption of 0.55% after 16 hr. in 122° F. water, an initial flexural strength of 21,600 p.s.i., an initial tangential modulus of 1,560,000 p.s.i., a flexural strength of 19,400 p.s.i. after 16 hr. in 122° F. water and a tangential modulus of 1,390,000 p.s.i. after 16 hr. in 122° F. water.

EXAMPLE 39

Similarly, a polyvinyl chloride laminate is prepared and tested as described in Example 37. The glass finish in this case consists of a modified polyazamide prepared according to Example 16.

The laminate has a thickness of 0.179 inch. Test specimens show a water absorption of 1.43% after 16 hr. in 122° F. water, an initial flexural strength of 24,800 p.s.i., an initial tangential modulus of 1,380,000 p.s.i., a flexural strength of 21,500 p.s.i. after 16 hr. in 122° F. water and a tangential modulus of 1,270,000 p.s.i. after 16 hr. in 122° F. water.

By comparison, a laminate prepared from heat-cleaned fabric has an initial flexural strength of 14,100 p.s.i., an initial tangential modulus of 1,020,000 p.s.i., a flexural strength of 12,200 p.s.i. after 16 hr. in 122° F. water and a tangential modulus of 960,000 p.s.i. after 16 hr. in 122° F. water. Further, a laminate prepared from glass cloth finished with an unmodified polyazamide prepared according to Example 1 has an initial flexural strength of 14,500 p.s.i., an initial tangential modulus of 1,030,000 p.s.i., a flexural strength of 12,900 p.s.i. after 16 hr. in 122° F. water and a tangential modulus of 790,000 after 16 hr. in 122° F. water.

EXAMPLE 40

A 50 wt.-percent methanolic solution of a modified polyazamide prepared according to Example 2 is used to finish glass fabric as described in Example 30. A dry laminate is then prepared by alternating eleven plies of the finished glass fabric with twelve plies of 0.010 inch-thick polypropylene film. The dry sandwich is placed in a press preheated to 400° F. and molded for 30 min. using M-122 Fluorocarbon-coated Mylar (trademark) film as a release.

The laminate has an 0.5% loading of finish, based on fabric weight, and a thickness of 0.156 inch. The test specimens, obtained and tested as described in Example 30, show a water absorption of 0.47% after 16 hr. in 122° F. water, an initial flexural strength of 19,100 p.s.i., an initial tangential modulus of 1,660,000 p.s.i., a flexural strength of 15,100 p.s.i. after 16 hr. in 122° F. water and a tangential modulus of 1,230,000 p.s.i. after 16 hr. in 122° F. water.

By comparison, a laminate prepared from heat-cleaned fabric has an initial flexural strength of 15,000 p.s.i., an initial tangential modulus of 1,710,000 p.s.i., a flexural strength of 10,300 p.s.i. after 16 hr. in 122° F. water and a tangential modulus of 1,250,000 after 16 hr. in 122° F. water. Further, a laminate prepared from glass cloth finished with an unmodified polyazamide prepared according to Example 1 has an initial flexural strength of 14,300 p.s.i., an initial tangential modulus of 1,480,000 p.s.i., a flexural strength of 11,000 p.s.i. after 16 hr. in 122° F. water and a tangential modulus of 960,000 after 16 hr. in 122° F. water.

EXAMPLE 41

Similarly, a polypropylene laminate is prepared and tested as described in Example 40. The glass finish in this case consists of a modified polyazamide prepared according to Example 4.

The laminate has a thickness of 0.158 inch. Test specimens show a water absorption of 0.40% after 16 hr. in 122° F. water, an initial flexural strength of 17,700 p.s.i., an initial tangential modulus of 1,520,000 p.s.i., a flexural strength of 14,100 p.s.i. after 16 hr. in 122° F. water and a tangential modulus of 940,000 p.s.i. after 16 hr. in 122° F. water.

By comparison, a laminate prepared from heat-cleaned fabric has an initial flexural strength of 15,000 p.s.i., an initial tangential modulus of 1,710,000 p.s.i., a flexural strength of 10,300 p.s.i. after 16 hr. in 122° F. water and a tangential modulus of 1.250,000 after 16 hr. in 122° F. water. Further, a laminate prepared from glass cloth finished with an unmodified polyazamide prepared according to Example 1 has an initial flexural strength of 14,300 p.s.i., an initial tangential modulus of 1,480,000 p.s.i., a flexural strength of 11,000 p.s.i. after 16 hr. in 122° F. water and a tangential modulus of 960,000 after 16 hr. in 122° F. water.

EXAMPLE 42

A 50 wt. percent methanolic solution of a modified polyazamide prepared according to Example 2 is used to finish glass fabric as described in Example 30. A dry laminate is then prepared by alternating eleven plies of the finished glass fabric with twelve plies of 0.010 inch-thick high-density polyethylene film. The dry sandwich is placed in a press preheated to 400° F. and molded for 30 min. using M-122 fluorocarbon-coated Mylar (Trademark) film as a release.

The laminate has an 0.5% loading of finish—based on fabric weight—and athickness of 0.165 inch. Test specimens—obtained and tested as described in Example I—show an initial flexural strength of 22,300 p.s.i., an initial tangential modulus of 1,350,000 p.s.i., a flexural strength of 17,500 p.s.i. after 16 hr. in 122° F. water and a tangential modulus of 1,310,000 p.s.i. after 16 hr. in 122° F. water.

By comparison, a laminate prepared from heat-cleaned fabric has an initial flexural strength of 16,100 p.s.i., an initial tangential modulus of 1,400,000 p.s.i., a flexural strength of 10,100 p.s.i. after 16 hr. in 122° F. water and a tangential modulus of 1,260,000 after 16 hr. in 122° F. water. Further, a laminate prepared from glass cloth finished with an unmodified polyazamide prepared according to Example 1 has an initial flexural strength of 18,400 p.s.i., an initial tangential modulus of 1,370,000 p.s.i., a flexural strength of 8,800 p.s.i. after 16 hr. in 122° F. water and a tangential modulus of 920,000 after 16 hr. in 122° F. water.

EXAMPLE 43

Similarly, a high-density polyethylene laminate is prepared and tested as described in Example 42. The glass finish in this case consists of a modified polyazamide prepared according to Example 4.

The laminate has a thickness of 0.168 inch. Test specimens show an initial flexural strength of 15,200 p.s.i., an initial tangential modulus of 1,350,000 p.s.i., a flexural strength of 11,700 p.s.i. after 16 hr. in 122° F. water and a tangential modulus of 1,120,000 p.s.i. after 16 hr. in 122° F. water.

By comparison, a laminate prepared from heat-cleaned fabric has an initial flexural strength of 16,100 p.s.i., an initial tangential modulus of 1,400,000 p.s.i., a flexural strength of 10,100 p.s.i. after 16 hr. in 122° F. water and a tangential modulus of 1,260,000 after 16 hr. in 122° F. water. Further, a laminate prepared from glass cloth finished with an unmodified polyazamide prepared according to Example 1 has an initial flexural strength of 18,400 p.s.i., an initial tangential modulus of 1,370,000 p.s.i., a flexural strength of 8,800 p.s.i. after 16 hr. in 122° F. water and a tangential modulus of 920,000 after 16 hr. in 122° F. water.

EXAMPLE 44

Similarly, a high-density polyethylene laminate is prepared and tested as described in Example 42. The glass finish in this case consists of a modified polyazamide prepared according to Example 6.

The laminate has a thickness of 0.166 inch. Test specimens show an initial flexural strength of 20,600 p.s.i., an initial tangential modulus of 1,370,000 p.s.i., a flexural strength of 15,800 p.s.i. after 16 hr. in 122° F. water and a tangential modulus of 1,250,000 p.s.i. after 16 hr. in 122° F. water.

By comparison, a laminate prepared from heat-cleaned fabric has an initial flexural strength of 16,100 p.s.i., an initial tangential modulus of 1,400,000 p.s.i., a flexural strength of 10,100 p.s.i. after 16 hr. in 122° F. water and a tangential modulus of 1,260,000 after 16 hr. in 122° F. water. Further, a laminate prepared from glass cloth finished with an unmodified polyazamide prepared according to Example 1 has an initial flexural strength of 18,400 p.s.i., an initial tangential modulus of 1,370,000 p.s.i., a flexural strength of 8,800 p.s.i. after 16 hr. in 122° F. water and a tangential modulus of 920,000 after 16 hr. in 122° F. water.

EXAMPLE 45

Similarly, a high-density polyethylene laminate is prepared and tested as described in Example 42. The glass finish in this case consists of a modified polyazamide prepared according to Example 16.

The laminate has a thickness of 0.167 inch. Test specimens show an initial flexural strength of 19,900 p.s.i., an initial tangential modulus of 1,410,000 p.s.i., a flexural strength of 16,400 p.s.i. after 16 hr. in 122° F. water and a tangential modulus of 1,290,000 p.s.i. after 16 hr. in 122° F. water.

By comparison, a laminate prepared from heat-cleaned fabric has an initial flexural strength of 16,100 p.s.i., an initial tangential modulus of 1,400,000 p.s.i., a flexural strength of 10,100 p.s.i. after 16 hr. in 122° F. water and a tangential modulus of 1,260,000 after 16 hr. in 122° F. water. Further, a laminate prepared from glass cloth finished with an unmodified polyazamide prepared according to Example 1 has an initial flexural strength of 18,400 p.s.i., an initial tangential modulus of 1,370,000 p.s.i., a flexural strength of 8,800 p.s.i. after 16 hr. in 122° F. water and a tangential modulus of 920,000 after 16 hr. in 122° F. water.

EXAMPLE 46

A 50 wt.-percent methanolic solution of a modified polyazamide prepared according to Example 2 is used to finish glass fabric as described in Example 30. A dry laminate is then prepared by alternating eleven plies of the finished glass fabric with twelve plies of 0.010 inch-thick nylon film. The dry sandwich is placed in a press preheated to 425° F. and molded for 20 min. using aluminum foil coated with M-122 Fluorocarbon as a release.

The laminate has an 0.5% loading of finish, based on fabric weight, and a thickness of 0.142 inch. Test specimens obtained and tested as described in Example I show a water absorption of 1.25% after 16 hr. in 122° F. water, an initial flexural strength of 48,600 p.s.i., an initial tangential modulus of 2,060,000 p.s.i., flexural strength of 36,100 p.s.i. after 16 hr. in 122° F. water and a tangential modulus of 1,680,000 p.s.i. after 16 hr. in 122° F. water.

By comparison, a laminate prepared from heat-cleaned fabric has an initial flexural strength of 40,200 p.s.i., an initial tangential modulus of 2,110,000 p.s.i., a flexural strength of 16,200 after 16 hr. in 122° F. water and a tangential modulus of 1,760,000 after 16 hr. in 122° F. water. Further, a laminate prepared from glass cloth finished with an unmodified polyazamide prepared according to Example 1 has an initial flexural strength of 46,300 p.s.i., an initial tangential modulus of 2,040,000 p.s.i., a flexural strength of 28,600 p.s.i. after 16 hr. in 122° F. water and a tangential modulus of 1,710,000 p.s.i. after 16 hr. in 122° F. water.

EXAMPLE 47

Similarly, a nylon laminate is prepared and tested as described in Example 46. The glass finish in this case consists of a modified polyazamide prepared according to Example 6.

The laminate has a thickness of 0.145 inch. Test specimens show a water absorption of 1.28% after 16 hr. in 122° F. water, an initial flexural strength of 46,000 p.s.i., an initial tangential modulus of 1,990,000 p.s.i., a flexural strength of 37,600 p.s.i. after 16 hr. in 122° F. water and a tangential modulus of 1,770,000 p.s.i. after 16 hr. in 122° F. water.

By comparison, a laminate prepared from heat-cleaned fabric has an initial flexural strength of 40,200 p.s.i., an initial tangential modulus of 2,110,000 p.s.i., a flexural strength of 16,200 after 16 hr. in 122° F. water and a tangential modulus of 1,760,000 after 16 hr. in 122° F. water. Further, a laminate prepared from glass cloth finished with an unmodified polyazamide prepared according to Example 1 has an initial flexural strength of 46,300 p.s.i., an initial tangential modulus of 1,990,000 p.s.i., a flexural strength of 28,600 p.s.i. after 16 hr. in 122° F. water and a tangential modulus of 1,710,000 p.s.i. after 16 hr. in 122° F. water.

EXAMPLE 48

Similarly, a nylon laminate is prepared and tested as described in Example 46. The glass finish in this case consists of a modified polyazamide prepared according to Example 16.

The laminate has a thickness of 0.138 inch. Test specimens show a water absorption of 1.12% after 16 hr. in 122° F. water, an initial flexural strength of 50,900 p.s.i., an initial tangential modulus of 2,110,000 p.s.i., a flexural strength of 39,500 p.s.i. after 16 hr. in 122° F. water and a tangential modulus of 1,840,000 p.s.i. after 16 hr. in 122° F. water.

By comparison, a laminate prepared from heat-cleaned fabric has an initial flexural strength of 40,200 p.s.i., an initial tangential modulus of 2,110,000 p.s.i., a flexural strength of 16,200 after 16 hr. in 122° F. water and a tangential modulus of 1,760,000 after 16 hr. in 122° F. water. Further, a laminate prepared from glass cloth finished with an unmodified polyazamide prepared according to Example 1 has an initial flexural strength of 46,300 p.s.i., an initial tangential modulus of 2,040,000 p.s.i., a flexural strength of 28,600 p.s.i. after 16 hr. in 122° F. water and a tangential modulus of 1,710,000 p.s.i. after 16 hr. in 122° F. water. Further, a laminate prepared from A-1100 silane-finished fabric has an initial flexural strength of 47,600 p.s.i., an initial tangential modulus of 2,020,000 p.s.i., a flexural strength of 34,500 p.s.i., after 16 hr. in 122° F. water and a tangential modulus of 1,680,000 p.s.i. after 16 hr. in 122° F. water.

EXAMPLE 49

A 50 wt.-percent methanolic solution of a modified polyazamide prepared according to Example 16 is included in the following formulation:

| | G. |
|---|---|
| P-93 glass spheres | 530 |
| Resole phenolic resin | 32.8 |
| Water | 8.96 |
| Polyazamide of Example 16 | 0.042 |
| Ammonium sulfate | 0.16 |

The materials are blended for 2 min. using a mortar and pestle after which they are divided into 45 g. charges and placed in "dog bone" specimen molds preheated to 450° F. The specimens are cured for 7 min. at 450° F.; the weight of cured specimens varies between 21 and 23 grams.

The tensile strength of these "dog bone' specimens is determined on a Baldwin-Tate Tester equipped with a special "dog bone" tensile jig. Initial tensile strength of the test specimens in 424 p.s.i. and the tensile strength after 16 hr. in 122° F. water is 48 p.s.i. By comparison, the initial tensile strength of specimens containing no polyazamide is 305 p.s.i. and the tensile strength after 16 hr. in 122° F. water is 0 p.s.i. Further, the initial tensile strength of specimens containing an unmodified polyazamide prepared according to Example 15(b) is 333 p.s.i. and the tensile strength after 16 hr. in 122° F. water is 0 p.s.i. Further, the initial tensile strength of specimens containing A-1100 silane is 368 p.s.i. and the tensile strength after 16 hr. in 122° F. water is 151 p.s.i. Further, the initial tensile strength of specimens containing A-1120 silane (gamma-(beta-aminoethyl) - aminopropyltrimethoxysilane) is 334 p.s.i. and the tensile strength after 16 hr. in 122° F. water is 181 p.s.i.

EXAMPLE 50

A 50 wt.-percent methanolic solution of a modified polyazamide prepared according to Example 2 is used to finish glass fabric as described in Example 30. Crease tensile specimens are then cut which are 1.5" wide by 8" long with the length parallel to the fabric warp direction. Creasing is accomplished by attaching each specimen, folded in half, to the apex of an inclined plane (having a 1" rise per 12" run) and rolling a 2,000 g. weight over the fold. Five rolls of the weight are used to crease each specimen. The crease tensile of the specimens, which is determined with a Baldwin-Tate Tester at a crosshead speed of 1.2 inches per minute, is 267.0 p.p.i.

By comparison, the crease tensile of specimens prepared from heat-cleaned fabric is 22.5 p.p.i.; the crease tensile of specimens prepared from A-1100 silane-finished fabric is 159.3 p.p.i.; the crease tensile of specimens prepared from A-174 (gamma-methacryloxypropyltrimethoxysilane) silane-finished fabric is 165.3 p.p.i.; the crease tensile of specimens prepared from fabric finished with an unmodified polyazamide prepared according to Example 1 is 202.0 p.p.i.

EXAMPLE 51

Similarly, glass cloth specimens are prepared and tested as described in Example 50. In this case, the glass finish consists of a modified polyazamide prepared according to Example 4. The average crease tensile of these specimens is 231.3 p.p.i.

By comparison, the crease tensile of specimens prepared from heat-cleaned fabric is 22.5 p.p.i.; the crease tensile of specimens prepared from A-1100 silane-finished fabric is 159.3 p.p.i.; the crease tensile of specimens prepared from A-174 silane-finished fabric is 165.3 p.p.i.; the crease tensile of specimens prepared from fabric finished with an unmodified polyazamide prepared according to Example 1 is 202.0 p.p.i.

EXAMPLE 52

Similarly, glass cloth specimens are prepared and tested as described in Example 50. In this case, the glass finish consists of a modified polyazamide prepared according to Example 16. The average crease tensile of these specimens is 258.0 p.p.i.

By comparison, the crease tensile of specimens prepared from heat-cleaned fabric is 22.5 p.p.i.; the crease tensile of specimens prepared from A-1100 silane-finished fabric is 159.3 p.p.i.; the crease tensile of specimens prepared from A-174 silane-finished fabric is 165.3 p.p.i.; the crease tensile of specimens prepared from fabric finished with an unmodified polyazamide prepared according to Example 1 is 202.0 p.p.i.

EXAMPLE 53

A 50 wt.-percent methanolic solution of a modified polyazamide prepared according to Example 2 is used to prepare an 0.5 wt.-percent solids aqueous solution. The solution is used to impregnate continuous glass roving which is then dried by passing through a heated, forced-air, vertical tower at 500° F. and a speed of 30 feet per minute. The dried roving is then chopped into ¼" discontinuous strands.

Three hundred grams of polystyrene is melted at 360° F. on a steam-heated, two-roll, differential-speed rubber mill and 130 g. (30% by weight of total mixture) of the above chopped strand are added gradually until a uniform composite results. The composite is then pressed for 5 min. at 350° F. and 48 tons pressure in an 8" x 8" x 0.125" steel mold. The cooled composite is cut into ½" x 4" flexural test specimens and tested according to ASTM specification D-790 on a Baldwin-Tate Tester. The average flexural strength of the test specimens is 11,000 p.s.i. By comparison, the flexural strength of specimens prepared from water-sized roving is 6,800 p.s.i. Further, the flexural strength of specimens containing an unmodified polyazamide prepared according to Example 1 is 8,400 p.s.i.

EXAMPLE 54

To clean glass plates there is applied by wiping a 5 wt.-percent isopropanol solution of each of the following:

(A) 1200 molecular weight polyethyleneimine.
(B) A polyazamide prepared according to Example 1.
(C) A modified polyazamide prepared according to Example 2.
(D) A modified polyazamide prepared according to Example 10.
(E) A modified polyazamide prepared according to Example 18.

To each plate there is then added 2 g. of an epoxy resin (as employed in Example 30) of the following formulation:

| | Parts |
|---|---|
| Epoxy resin | 100 |
| meta-Phenylenediamine | 14 |

After drying for 1 hr., the plates are post-cured at 350° F. for 30 min., then immersed in water at room temperature for 70 hr. followed by 4 hr. in boiling water.

On inspection, the epoxy resin shows no adhesion to Plates A and B and excellent adhesion to Plates C, D and E. No adhesion of the epoxy resin to a clean plate is observed.

What is claimed is:

1. Novel silicon containing polyazamide compound comprising a polycarboxamide containing secondary nitrogen atoms therein which are separated from the carbonyl moieties of the carboxamide groups by divalent alkylene groups containing one to three, inclusive, sequential saturated carbon atoms, a nitrogen to carbonyl mole ratio of at least 1.5 and not exceeding about 26, each bonded silicon atom is bonded through a carbon atom of a divalent organic group which is directly bonded to a nitrogen atom of the polyazamide by a carbon to nitrogen bond, the remaining free valences of each silicon atom are bonded to at least one of a monovalent organic radical by a carbon to silicon bond, a hydrolyzable monovalent organooxy radical, hydrogen and/or oxygen which in turn is bonded to another silicon whose free valences are saturated by one of oxygen and monovalent organic radicals, to form a siloxane therewith, and the weight of the silicon containing moieties does not exceed twice the weight of the polyazamide moieties and comprises at least 0.25 weight percent of the total weight of the compounds.

2. The polyazamide of claim 1 wherein the polycarboxamide is formed by the Michael addition of an amino compound and an alpha, beta-ethylenically unsaturated monocarboxylic acid ester.

3. The polyazamide of claim 1 wherein the polycarboxamide is formed by the haloalkylation condensation of an amino compound and a haloalkanoic acid ester.

4. The polyazamide of claim 1 wherein each silicon atom is pendently bonded to the backbone of the polycarboxamide.

5. The polyazamide of claim 2 wherein the amino compound is a polyamine.

6. The polyazamide of claim 3 wherein the amino compound is a polyamine.

7. The polyazamide of claim 5 wherein the monocarboxylic acid ester is an alkyl acrylate.

8. The polyazamide of claim 5 wherein the monocarboxylic acid ester is an alkyl methacrylate.

9. The polyazamide of claim 7 wherein the polyamine is ethylene diamine.

10. The polyazamide of claim 8 wherein the polyamine is ethylene diamine.

References Cited
UNITED STATES PATENTS 3,562,353  2/1971  Chow et al. _____ 260—824

DONALD E. CZAJA, Primary Examiner

M. I. MARQUIS, Assistant Examiner

U.S. Cl. X.R.

117—126 GS; 161—185, 193, 203; 260—2 S, 2.5 R, 31.2 R, 32.6 R, 33.2 SB, 33.4 SB 33.6 SB, 46.5 G, 77.5 AT, 77.5 AM, 78 A, 824 R